June 1, 1926.
W. A. JOHNSON
HOSE COUPLING
Filed May 22, 1923
1,587,327
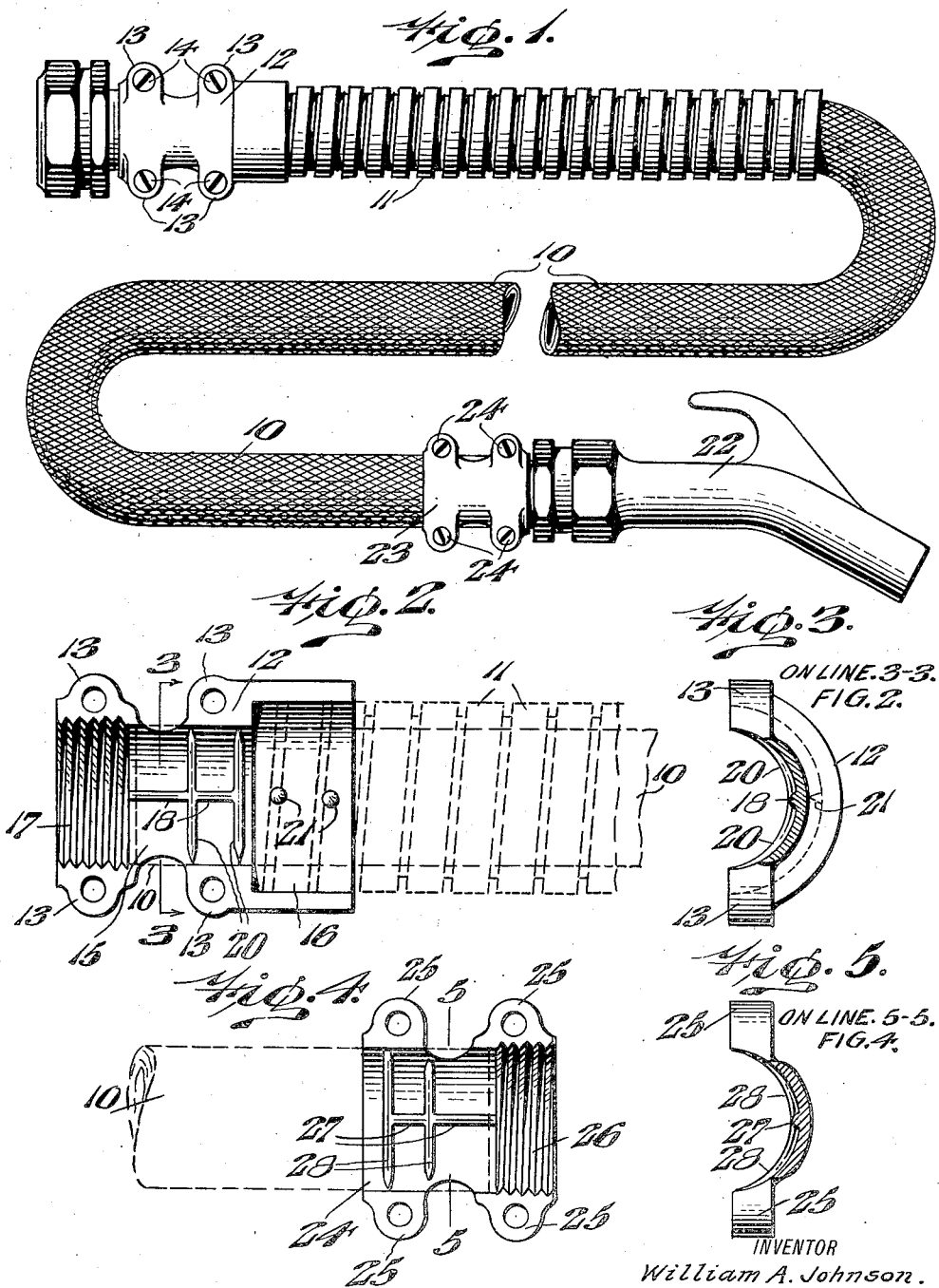
INVENTOR
William A. Johnson.
BY Robert M. Barr
ATTORNEY Patented June 1, 1926.

1,587,327

UNITED STATES PATENT OFFICE.

WILLIAM A. JOHNSON, OF CHICAGO, ILLINOIS, ASSIGNOR TO PENNSYLVANIA FLEX-
IBLE METALLIC TUBING COMPANY, OF PHILADELPHIA, PENNSYLVANIA, A COR-
PORATION OF PENNSYLVANIA.

HOSE COUPLING.

Application filed May 22, 1923. Serial No. 640,665.

Some of the objects of the present invention are to provide improved coupling devices for opposite ends of a length of hose; to provide a readily removable clamping coupling for the end of a hose; to provide means for preventing a flexible hose from breaking or splitting at the line of connection with a rigid fitting; to provide an improved coupling construction wherein the bore of the hose is unobstructed and remains of full diameter throughout its length; to provide a hose coupling, having an effective clamping action, while comprising few parts so arranged as to be quickly assembled or taken apart; to provide a complete unitary hose length equipped with clamping devices for direct connection respectively with suitable fittings; and to provide other improvements as will hereinafter appear.

In the accompanying drawings, Fig. 1 represents a side elevation of a length of hose equipped with end couplings embodying one form of the present invention; Fig. 2 represents an axial face of the coupling employed at the inlet end of the hose with one part removed; Fig. 3 represents a section on line 3—3 of Fig. 2; Fig. 4 represents an axial face of the coupling employed at the discharge end of the hose with one part removed; and Fig. 5 represents a section on line 5—5 of Fig. 4.

Referring to the drawings, one form of the present invention is shown as applied to a flexible hose 10 such as used at gasoline filling stations for conveying gasoline from the pump line to an automobile tank or other place of use, though it is to be understood that this is merely an example of the use of the invention, as obviously it may be employed wherever hose or flexible tubing is to be used.

In order to distribute the strain caused by bending the hose 10 in one direction and another about the fixed inlet end, a length of flexible metallic tubing 11 is provided, the inner diameter of which is such as to allow the tubing 11 to fit snugly over the fabric or outer covering of the hose 10. The length of this tubing 11 is sufficient to fully reinforce the hose 10 at points where it is naturally weakened by bending stresses, and in addition its resistance to bending causes the flexing point of the hose to be shifted further from the inlet end so that the hose tends to bend with a natural curve instead of along a sharp well defined angle.

For the purpose of coupling the inlet end of the hose 10 to a suitable supply fitting, a tubular two part sleeve body 12 is provided having apertured threaded lugs 13 on the respective parts whereby the sections of the sleeve 12 can be rigidly made fast to the end of the hose 10 by the clamping action of stud screws 14. For a portion of the length of the sleeve body 12 there is a bore 15 having substantially the diameter of the hose to which the coupling is to be applied while the remaining length of the body 12 is of enlarged diameter to form an annular seat 16 to fit over and receive the end portion of the protecting armor tubing 11. When the coupling body 12 is in operative position upon the hose 10 its outer end projects beyond the end of the hose 10 and the bore of that portion is provided with a screw thread 17 whereby a nipple, union head or other fitting can be connected thereto for joining the hose to the line.

As a means for interlocking the coupling body 12 to the hose 10 to prevent relative movement between the parts or displacement of the body, the surface of the bore 15 is provided with a rib 18 running in the axial direction of the body and a plurality of ribs 20 extending in a circumferential direction and preferably intersecting the rib 18. Thus, when the body 12 is clamped fast to the hose 10, these ribs 18 and 20 bite into the fabric sufficiently to anchor the body firmly. Also, to prevent displacement of the armor tubing 11, the surface of the seat 16 is provided with one or more projecting pins 21 which are arranged to engage between adjacent convolutions of the tubing 11.

As a means for coupling the discharge end of the hose 10 to a nozzle 22 or other fitting it is arranged to fit within a coupling body 23, the bore 24 of which conforms generally to the shape and dimension of the hose 10. This coupling body 23 is preferably of split construction forming two complemental parts which are clamped together about the hose by stud screws 24 cooperating with lugs 25, one set of which is threaded as will be understood. In assembling the body 23 upon the hose 10, it is clamped in position with a portion projecting beyond the end of the hose and such projecting portion is provided with an internal thread 26 whereby a nipple, union head or other means can be threaded therein to rigidly fasten the nozzle 22 to the hose 10. The surface of the bore 24 is preferably provided with a rib 27 extending in the axial direction of the body, and two ribs 28 running circumferentially thereof so that when the parts of the body are clamped upon the hose 10 these ribs 27 and 28 are forced into the fabric and interlock the hose 10 and the body 23.

From the foregoing it will be apparent that a complete unitary hose construction is provided wherein a simple and effective coupling means is employed in which all nipples and sleeves fitting within the ends of the hose are entirely dispensed with. It should be noted that it is the common practice in hose coupling construction to provide a member to be forced into the hose end and then employ a clamping device coacting through the hose with the interior member to form a more or less permanent end fitting for the hose. In such devices the removal of the fitted coupling, in case of a break in the hose, becomes a difficult task and one not at all within the qualifications of the unskilled users of such hose. As a result damaged hose must be sent to a repair shop and the apparatus with which the hose is used remains out of commission until the reconstructed hose is returned. By the present invention the above disadvantages are overcome because the coupling for both ends of the hose comprises but two parts mounted directly upon the outside of the hose where they can be quickly attached or detached for purposes of repair, and the most unskilled workman is able to remove the four clamping screws to change the location of the coupling after a broken end has been cut off. Also, the exterior coupling means embodies an extension for connecting the device directly to a nozzle or other fitting while preserving an unobstructed and full sized bore at the hose end.

Further, by forming the coupling for the inlet end of the hose with an enlarged annular flange and a length of flexible metallic armor arranged to be held by the aforesaid flange, an effective means is provided for causing bending strains to be distributed along the length of the hose instead of being centered in the circumferential line formed by the edge of the attached fitting. Thus, by spreading the bending action, the hose is caused to flex or bend on an arc which closely approximates the natural curve of the hose.

Having thus described my invention, I claim:

1. In a hose construction, the combination of a length of flexible hose, a flexible metallic armor of relatively short length fitting over an end portion of said hose, a coupling having bores of different diameter formed therein, one of said bores seating over said hose end and the other of said bores seating over an end of said armor, a threaded part of said coupling projecting beyond the end of said hose for attaching said part to a cooperating part, means for clamping said coupling to said hose and armor, and internally projecting means in one of said bores to prevent relative movement between said coupling and said hose.

2. In a hose construction, the combination of a length of flexible hose, a flexible metallic armor of relatively short length fitting over an end portion of said hose, a coupling having bores of different diameter formed therein, one of said bores seating over said hose end and the other of said bores seating over an end of said armor, a threaded part of said coupling projecting beyond the end of said hose for attaching said part to a cooperating part, means for clamping said coupling to said hose and armor, and internally projecting means in both of said bores to prevent relative movement between said coupling and either said hose or said armor.

Signed at Chicago, in the county of Cook, State of Illinois, this first day of May, 1923.

WILLIAM A. JOHNSON.